(12) United States Patent
Tian et al.

(10) Patent No.: US 11,802,082 B2
(45) Date of Patent: Oct. 31, 2023

(54) CO-DISPOSAL POLLUTION CONTROL METHOD OF MUNICIPAL SOLID WASTE AND FLY ASH LEACHED BY MEMBRANE CONCENTRATE, OBTAINED RESIDUE AND APPLICATION THEREOF

(71) Applicant: Chinese Research Academy of Environmental Sciences, Beijing (CN)

(72) Inventors: Shulei Tian, Beijing (CN); Hao Wu, Beijing (CN); Zongru Wu, Beijing (CN); Qingxu Wang, Beijing (CN); Nannan Huang, Beijing (CN); Jieya Zhou, Beijing (CN); Qian Wu, Beijing (CN); Lihu Shi, Beijing (CN); Cuo Wang, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 0 days.

(21) Appl. No.: 18/073,117

(22) Filed: Dec. 1, 2022

(65) Prior Publication Data
US 2023/0303441 A1  Sep. 28, 2023

(30) Foreign Application Priority Data
Mar. 28, 2022 (CN) .......................... 202210316264.2

(51) Int. Cl.
| | |
|---|---|
| C04B 18/30 | (2006.01) |
| C04B 28/02 | (2006.01) |
| B09B 3/40 | (2022.01) |
| C04B 7/36 | (2006.01) |
| B09B 101/30 | (2022.01) |
| C04B 111/00 | (2006.01) |

(52) U.S. Cl.
CPC .............. C04B 18/305 (2013.01); B09B 3/40 (2022.01); C04B 7/365 (2013.01); C04B 28/021 (2013.01); B09B 2101/30 (2022.01); C04B 2111/00784 (2013.01)

(58) Field of Classification Search
CPC ..... B09B 3/40; B09B 2101/30; C04B 18/305; C04B 7/365; C04B 28/021; C04B 2111/00784
See application file for complete search history.

(56) References Cited

FOREIGN PATENT DOCUMENTS

| | | |
|---|---|---|
| CN | 108980853 A | 12/2018 |
| CN | 111171847 A | 5/2020 |

*Primary Examiner* — Anthony J Green
(74) *Attorney, Agent, or Firm* — WPAT, P.C

(57) ABSTRACT

This invention provides a co-disposal pollution control method of municipal solid waste and fly ash leached by membrane concentrate, obtained residue and application thereof. A co-disposal pollution control method of municipal solid waste and fly ash leached by membrane concentrate, comprising the following steps: heat treating the mixture of leached ash and municipal solid waste at 800-1100° C. to obtain residue; the leaching ash is fly ash after being leached with membrane concentrate. The invention solves the problems existed in the co-disposal treatment of membrane concentrate, incineration fly ash and municipal solid waste, and the leaching toxicity of the ash leached by the membrane concentrated solution is reduced, moreover, the leaching concentration of heavy metals in the residue obtained after the leaching treatment is treated with municipal solid waste at medium and high temperature, and the residue obtained after heat treatment can be used as building materials.

12 Claims, 1 Drawing Sheet

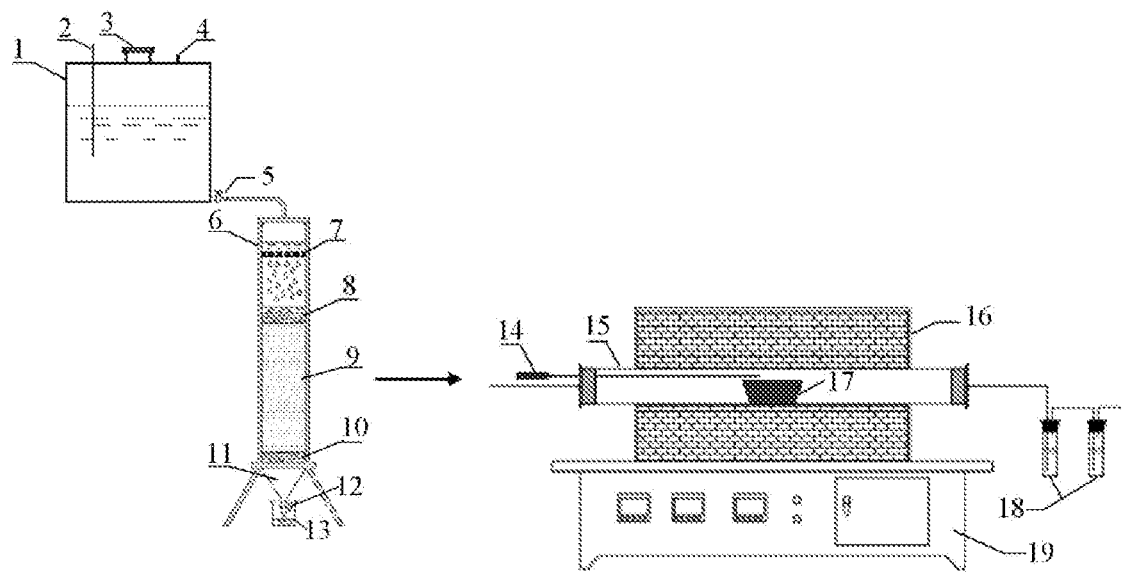

CO-DISPOSAL POLLUTION CONTROL METHOD OF MUNICIPAL SOLID WASTE AND FLY ASH LEACHED BY MEMBRANE CONCENTRATE, OBTAINED RESIDUE AND APPLICATION THEREOF

TECHNICAL FIELD

This invention relates to the technical field of waste treatment and resource utilization, particularly relates to a co-disposal pollution control method of municipal solid waste and fly ash leached by membrane concentrate, obtained residue and application thereof.

BACKGROUND

Incineration and landfill are the two major methods to treat municipal solid waste, by 2020, their treatment capacity have accounted for 50.7% and 45.6% of the total capacity of harmless treatment of municipal solid waste, respectively. Fly ash and membrane concentrate are secondary pollutants in the harmless treatment of municipal solid waste.

Incineration fly ash is dust particles captured by flue gas purification system during incineration of municipal solid waste, and membrane concentrate is a high-concentration organic wastewater produced by using membrane to treat leachate in incineration plants and landfills of municipal solid waste. The environmentally safe utilization and harmless treatment of incineration fly ash and membrane concentrated solution have become a bottleneck of industry development. Incineration fly ash has the characteristics of high leaching concentration of heavy metals, high traces of toxic dioxins and a large amount of soluble chlorine salts, therefore, China has classified incineration fly ash as hazardous waste for management.

Incineration fly ash has a high leaching concentration of heavy metals, trace amounts of highly toxic dioxins and contains a large number of soluble chlorine salts, China has classified incineration fly ash as hazardous waste for management. At present, the main disposal method is to use solidification and stabilization to pre-treat incineration fly ash before dumping it at municipal solid waste landfill, and a small part of it enters the cement kiln for co-disposal treatment. Before incineration fly ash enters the landfill, it needs to be pretreated by technologies such as cement solidification and chemical agent (inorganic agent and organic agent) stabilization. However, there are two problems when it enters the landfill for disposal: First, it has been found that the heavy metals in the incineration fly ash could leach out again after a period of time entering the municipal solid waste landfill, which increases the risk of environmental pollution; furthermore, more and more municipal solid waste landfills are about to be closed, and the situation of incineration fly ash entering landfills for disposal has become increasingly severe, so it is necessary to explore new disposal modes. At present, the resources utilization of incineration fly ash is mainly co-disposal treatment in cement kiln, but the co-disposal technology of cement kiln can not meet the demand of large-scale disposal of incineration fly ash. Moreover, the co-treatment of incineration fly ash in cement kiln requires water washing pretreatment to remove soluble chlorine salt, therefore, a large amount of high-salt wastewater and waste salt produced by the process should also be treated.

Membrane concentrate is a by-product of combined disposal processes of "biochemical treatment+membrane treatment (nanofiltration/reverse osmosis)" for treating landfill leachate; which contains a large amount of refractory organic matters and has poor biodegradability. At present, membrane concentrate is mostly recycled to municipal solid waste landfill for disposal, leading to the accumulation of refractory organic matter, heavy metals and salt in leachate, which greatly increases the difficulty of leachate treatment and shortening the service life of membrane. Advanced treatment technologies of membrane concentrate in industry mainly include evaporation, advanced oxidation and others, but in practical engineering, it is difficult to run these technologies stably, and requires high running and maintenance costs. Whether or not the membrane concentrate solution can be safely disposed of has become the crux of leachate treatment.

As the establishment of ecological civilization in modern civilization system and the increasing requirements of ecological environment protection, it is imperative to develop the mode of ecological recycling utilization and disposal of incineration fly ash and membrane concentrate. In view of this, this invention is hereby proposed.

SUMMARY

This invention provides co-disposal pollution control method of municipal solid waste and fly ash leached by membrane concentrate, in order to solve the technical problems of incineration fly ash and membrane concentrate in the prior art, such as the difficulty of environmentally safe and sound utilization.

The other purpose of this invention is to provide a co-disposal pollution control method of municipal solid waste and fly ash leached by membrane concentrate, obtained residue and application thereof.

In order to achieve the above purpose of the present invention, the following technical solutions are used.

A co-disposal pollution control method of municipal solid waste and fly ash leached by membrane concentrate, comprising the following steps: carrying out heat treatment of a mixture of leached ash and municipal solid waste at 800-1100° C. to obtain a residue; wherein, the leached ash in the mixture is fly ash leached with membrane concentrate.

According to the invention, the membrane concentrate is used for leaching fly ash to remove solid-soluble organic matters, chromaticity, ammonia nitrogen, sulfate ions, phosphate ions and soluble chlorine salts from the membrane concentrate, making the membrane concentrated solution change from high-concentration organic wastewater, which is difficult for stable treatment, into colorless, transparent and stable high-salinity wastewater, moreover, sulfate and phosphate in the membrane concentrate can react with some metals in the fly ash to generate compounds with stable properties.

Then, the leached ash is mixed with municipal solid waste for heat treatment to remove organic matter and solidify heavy metals, therefore, the leaching content and toxicity of heavy metals in the obtained residue are significantly reduced, which meets the national standards of "Identification Standard of Hazardous Wastes", and "Identification Standard of Toxic Substances Content".

In the embodiment of the invention, the heat treatment time is 1-5 h.

In the embodiment of the invention, the atmosphere of the heat treatment is air. Furthermore, air is used as the carrier gas in the heat treatment process, and the tail gas in the heat treatment process is subjected through adsorption treatment.

In the embodiment of the invention, a mass ratio of the leached fly ash to the municipal solid waste is 1:(25-55).

In the embodiment of the invention, the mixture also comprises a CA auxiliaries; wherein, a chemical composition of the CA auxiliaries is weighed in parts by mass as follows: 20 parts of $SiO_2$, 28 parts of $Al_2O_3$, 30 parts of $Na_2O$, 10 parts of $Fe_2O_3$ and 5 parts of MgO; further, an addition amount of the CA auxiliaries is 5 wt %~20 wt % by mass of the leached ash.

In the embodiment of the invention, the preparation of the leached ash comprises the following steps: leaching the fly ash with membrane concentrate, and collecting solids for drying. Further, the drying methods include baking dry. In practice, the dried solid is screened by a 100-mesh sieve.

In the embodiment of the invention, the leaching rate is 40-80 ml/h.

This invention also provides a residue obtained by co-disposal pollution control method of municipal solid waste and fly ash leached by membrane concentrate according to any one of methods described above.

In the embodiment of the invention, a leaching concentration of heavy metals in the residue; meeting conditions as follows: a leaching concentration of $Cr \leq 0.35$ mg/L, a leaching concentration of $Cd \leq 0.07$ mg/L, a leaching concentration of $Pb \leq 0.02$ mg/L, a leaching concentration of $Zn \leq 0.4$ mg/L and a leaching concentration of $Cu \leq 0.05$ mg/l.

In the embodiment of the invention, a content of toxic substances in the residue; meeting conditions as follows: cadmium selenide $\leq 0.007\%$, lead difluoride $\leq 0.025\%$, zinc fluoride $\leq 0.07\%$, lead oxide $\leq 0.025\%$, chromate $\leq 0.01\%$, cadmium oxide $\leq 0.007\%$, cadmium fluoride $\leq 0.007\%$, lead chromate $\leq 0.025\%$, lead phosphate $\leq 0.025\%$.

This invention also provides an application of any of the above mentioned residues in use as a building material.

The residue treated by the invention can meet the requirements of general industrial solid waste through identification, and can be used as building materials to improve the resource utilization rate.

Compared with the prior art, this invention has the beneficial effects as follows:

The invention solves the problems existed in the co-disposal treatment of membrane concentrate, incineration fly ash and municipal solid waste, and the leaching toxicity of the ash leached by the membrane concentrated solution is reduced, moreover, after the leached ash is heat-treated with municipal solid waste at medium and high temperature, the leaching concentration of heavy metals in the residue obtained meets the corresponding limit requirements of "Pollution Control Standard for municipal solid waste Landfill" (GB 16889-2008), and it should not be included in the management of hazardous wastes after being identified by "Identification Standard of Hazardous Wastes" (GB5085.3-2007), and the residue after heat treatment can be used as building materials.

The invention adopts the co-disposal treatment of the waste, it does not need chemical additives, and has the advantages of low cost, simple operation, obvious treatment effect, moreover, it realizes obvious reduction of municipal solid waste and high utilization rate of fly ash resources; moreover, the ash contains a large amount of organic matters, which can be removed in the heat treatment process and provide some heat energy.

BRIEF DESCRIPTION OF DRAWINGS

In order to more clearly explain the specific embodiment of the present invention or the technical scheme in the prior art, the following will briefly introduce the drawings needed in the description of the specific embodiment or the prior art. Obviously, the drawings in the following description are some embodiments of the present invention, and for those of ordinary skill in the art, other drawings can be obtained according to these drawings without any creative effort.

FIG. 1 illustrates a schematic view of the co-disposal device adopted by the invention

DESCRIPTION OF REFERENCE NUMERALS IN THE FIGURES

1—membrane concentrate storage tank; 2—air inlet pipe; 3—sample inlet; 4—exhaust port; 5—flow control valve; 6—fly ash column; 7—water distribution unit; 8—the first quartz sand layer; 9—fly ash layer; 10—the second quartz sand layer; 11—leachate buffer area; 12—water stop valve; 13—receiving container; 14—thermocouple; 15—heating furnace; 16—heat insulation layer of furnace body; 17—heating container; 18—tail gas purification unit; 19—furnace temperature controller.

DETAILED DESCRIPTION OF EMBODIMENTS

The technical scheme of the present invention will be clearly and completely described below with reference to the drawings and specific embodiments, but those skilled in the art will understand that the following described embodiments are part of the embodiments of the present invention, not all of them, and are only used to illustrate the present invention, and should not be regarded as limiting the scope of the present invention. Based on the embodiment of the present invention, all other embodiments obtained by ordinary technicians in the field without creative labor are within the scope of the present invention. If the specific conditions are not indicated in the examples, the conventional conditions or the conditions suggested by the manufacturer shall be followed. The reagents or instruments used, if the manufacturer is not indicated, are conventional products that can be purchased on the market.

A co-disposal pollution control method of municipal solid waste and fly ash leached by membrane concentrate, comprising the following steps:

Carrying out heat treatment of a mixture of leached ash and municipal solid waste at 800-1100° C. to obtain a residue; wherein, the leached ash in the mixture is fly ash leached with membrane concentrate.

According to the invention, the membrane concentrate is used for leaching fly ash to remove solid-soluble organic matters, chromaticity, ammonia nitrogen, sulfate ions, phosphate ions and soluble chlorine salts from the membrane concentrate, making the membrane concentrated solution change from high-concentration organic wastewater, which is difficult for stable treatment, into colorless, transparent and stable high-salinity wastewater, moreover, sulfate and phosphate in the membrane concentrate can react with some metals in the fly ash to generate compounds with stable properties.

The leached ash is mixed with municipal solid waste for heat treatment to remove organic matter and solidify heavy metals. Leaching concentration and toxicity of heavy metals in the obtained residue are significantly reduced, meeting the national standards of "identification of leaching toxicity of hazardous waste identification standard" and "identification of toxic substance content of hazardous waste identification standard".

In different embodiments, the temperature of the heat treatment can be 800° C., 850° C., 900° C., 950° C., 1000° C., 1050° C., 1100° C. and so on.

In the preferred embodiment of the present invention, the temperature of the heat treatment is 850-1050° C. More preferably, the temperature of the heat treatment is 900-1000° C.

By adopting the above heat treatment temperature, both the leaching concentration of heavy metals and the content of toxic substances in the treated residue can be reduced.

In the specific embodiment of the present invention, the heat treatment time is 1-5 h, and may be further 1.5-2.5 h.

As in different embodiments, the heat treatment time can be 1 h, 1.5 h, 2 h, 2.5 h, 3 h, 3.5 h, 4 h, 4.5 h, 5 h, etc.

In the specific embodiment of the invention, the atmosphere of the heat treatment is air. Furthermore, in the heat treatment process, air is used as the carrier gas, and the tail gas generated in the heat treatment process is subjected through adsorption treatment;

In the specific embodiment of the invention, the mass ratio of the leached ash to the municipal solid waste is 1:(25-55).

In the different embodiment of the invention, the mass ratio of the leached ash to the municipal solid waste may be 1:25, 1:30, 1:35, 1:40, 1:45, 1:50, 1:55, and so on.

In the preferred embodiment of the invention, the mass ratio of the leached ash to the municipal solid waste is 1:(30-50).

In the specific embodiment of the invention, the mixture also comprises a CA auxiliaries; wherein, a chemical composition of the CA auxiliaries is weighed in parts by mass as follows: 18-22 parts of $SiO_2$, 18~22-30 parts of $Al_2O_3$, 28-32 parts of $Na_2O$, 8-12 parts of $Fe_2O_3$ and 3-8 parts of MgO; preferably, the chemical composition of the CA auxiliaries is weighed in parts by mass as follows: 20 parts of $SiO_2$, 28 parts of $Al_2O_3$, 30 parts of $Na_2O$, 10 parts of $Fe_2O_3$ and 5 parts of MgO;

Further, the addition amount of the CA auxiliaries is 5-20 wt % of the mass of the leaching ash; More preferably 5 wt %.

In the embodiment of the invention, the preparation of the leached ash comprises the following steps: leaching the fly ash with membrane concentrate, and collecting solids for drying. Further, the drying methods include baking dry. In practice, the dried solid is screened by a 100-mesh sieve.

In the specific embodiment of the invention, the leaching rate is 40-80 ml/h.

In different embodiments, the rate of the leaching treatment can be 40 mL/h, 50 mL/h, 60 mL/h, 70 mL/h, 80 mL/h, etc.

The elution efficiency of chlorine salt and Pb in incineration fly ash treated by membrane concentrate is 70%~95%, 20%~42%, and the leaching toxicity is reduced by 70%~92%.

This invention also provides a residue obtained by co-disposal pollution control method of municipal solid waste and fly ash leached by membrane concentrate according to any one of methods described above.

In the specific embodiment of the invention, a leaching concentration of heavy metals in the residue; meeting conditions as follows: a leaching concentration of Cr≤0.35 mg/L, a leaching concentration of Cd≤0.07 mg/L, a leaching concentration of Pb≤0.02 mg/L, a leaching concentration of Zn≤0.4 mg/L and a leaching concentration of Cu≤0.05 mg/l;

The leaching concentration of each heavy metal in the residue treated by the method of this invention can meet the requirements of the middle limit value of "Identification Standard of Hazardous Wastes-Identification of Leaching Toxicity" (GB5085.3-2007).

The residue treated and obtained by the method of the invention, leaching concentration of Cr can reach 0.14 mg/L, and leaching concentration of Cd can reach 0.00041 mg/L, leaching concentration of Pd can reach 0.0001 mg/L, leaching concentration of Zn can reach 0.0007 mg/L, leaching concentration of Cu can reach 0.001 mg/L.

In the specific embodiment of the invention, a content of toxic substances in the residue; meeting conditions as follows: cadmium selenide ≤0.007%, lead difluoride ≤0.025%, zinc fluoride ≤0.07%, lead oxide ≤0.025%, chromate ≤0.01%, cadmium oxide ≤0.007%, cadmium fluoride ≤0.007%, lead chromate ≤0.025%, lead phosphate ≤0.025%.

The toxic substance content of each heavy metal in the residue treated by the method can meet the limit requirements of "Identification Standard of Hazardous Wastes-Identification of Toxic Substances Content" (GB5085.6-2007).

The residue treated and obtained by this invention, the content of cadmium selenide can reach 0.0007%, the content of lead fluoride can reach 0.0062%, the content of zinc fluoride can reach 0.031%, the content of lead monoxide can reach 0.0062%, the content of chromate can reach 0.0075%, the content of cadmium oxide can reach 0.0007%, the content of cadmium fluoride can reach 0.0007%, the content of chromic acid can reach 0.0062%, the content of phosphoric acid can reach 0.0062%.

This invention also provides an application of the residue as claimed in claim 8 or 9 as a building material.

The residue treated by the invention can meet the requirements of general industrial solid waste through official identification, and can be used as building materials to improve the resource utilization rate.

Furthermore, the device for leaching fly ash by membrane concentrate for co-disposal of municipal solid waste in the present invention is shown in FIG. 1, and the specific structure can be referred to the patent application with the publication number of CN108980853A.

The device for leaching fly ash with membrane concentrated solution for cooperative disposal of municipal solid waste comprises a leaching unit and a heat treatment unit. The leaching unit is used for leaching incineration fly ash with membrane concentrate, and the heat treatment unit is used for heat treatment of the mixture of leached ash and municipal solid waste.

The leaching unit comprises a membrane concentrate storage tank 1 and a fly ash column 6; the membrane concentrate solution storage tank 1 is communicated with the top of the fly ash column 6 through a conduit. The conduit is provided with a flow control valve 5 to regulate the rate of leaching treatment.

The top of the membrane concentrated solution storage tank 1 is provided with an air inlet pipe 2, a sample inlet 3 and exhaust port 4. The air inlet pipe 2 extends to the inner bottom of the membrane concentrate storage tank 1, so that the leaching process is carried out under constant pressure; the sample inlet 3 is used for adding membrane concentrated solution.

The membrane concentrate storage tank 1 can be a Markov bottle. The fly ash column 6 comprises a column body and a filler, the filler is filled in the column body, and the filler comprises a second quartz sand layer 10, a fly ash layer 9 and a first quartz sand layer 8, which are arranged from bottom to top, and a water distribution unit 7 is arranged above the first quartz sand layer 8, so that the membrane concentrated solution is uniformly drenched on the filler after passing through the water distribution unit 7. The filled column can be selected according to the actual requirements, and plexiglass column is preferred to avoid corrosion. In practice, nylon mesh is arranged between each quartz sand layer and the fly ash layer 9, and a uniform porous pad is arranged at the bottom of the plexiglass column.

The fly ash layer 9 is properly compacted, and the filling height is 12~18 cm, so that the incineration fly ash particles can fully retain the pollutants in the membrane leachate, and the harmful heavy metals in the fly ash can be effectively dissolved and eluted. The filling height of the first quartz sand layer 8 and the second quartz sand layer 10 is 2-3 cm.

The bottom of the column is provided with leachate buffer area 11, which is used for buffering the leachate obtained by leaching treatment. The bottom of the leaching buffer area 11 is provided with a water stop valve 12 for opening or closing the leaching process.

The bottom of the water stop valve 12 is provided with a receiving container 13 for receiving the leachate. In practice, as far as the leaching process is concerned, the timing point is the beginning of the water discharge from the fly ash column 6, then the leachate is taken every 10~12 h, and the conductivity of the leachate is measured, it reaches the end of leaching when the conductivity of the leachate is stable, and leaching was completed.

The heat treatment unit includes thermocouple 14, heating furnace 15, furnace insulation layer 16, heating container 17, tail gas purification unit 18, and furnace temperature controller 19.

The heating furnace 15 can be a high-temperature tubular furnace or a multifunctional tubular furnace, and the thermocouple 14 and the furnace temperature controller 19 detect and regulate the heat treatment temperature of the mixture of fly ash and municipal solid waste by controlling the heating furnace 15.

The furnace body heat insulation layer 16 covers the outer wall of the heating furnace 15, and is used for heat insulation of the furnace body of the heating furnace 15. The heating container 17 is used to contain the mixture of ash and municipal solid waste, and the heating container 17 can be a corundum crucible, after the mixture is filled in the heating container 17, it is placed in the heating furnace 15 and subjected to heat treatment. In actual operation, an air bottle can be connected to one end of the heating furnace 15 for introducing air into the heating furnace 15. The tail gas purification unit 18 is connected to the other end of the heating furnace 15, so that the tail gas generated after being heated by the heating furnace 15 is purified by the tail gas purification unit 18 and then discharged. The tail gas purification unit 18 mainly includes reagents for acid-base absorption treatment.

Embodiment 1-12

This invention provides a co-disposal pollution control method of municipal solid waste and fly ash leached by membrane concentrate, comprising the following steps:

(1) Incineration fly ash was leached with membrane concentrated solution through the leaching unit; Specifically, the filling height of incineration fly ash was 12 cm, the filling height of each quartz sand layer was 2~3 cm, and the leaching speed was controlled at 40 ml/h; the conductivity of leachate was monitored by taking the fly ash column as the time point, and when the conductivity of the leachate was stable, it was the end of leaching, and leaching was completed.

(2) The leached ash was taken out after leaching in step (1), it was spread on a tray and placed in an oven, the ash was bake dried at 105° C. for 24 h, and naturally cooled, then it was ground and sifted through a 100-mesh sieve, next, it was mixed with municipal solid waste and CA auxiliaries in a certain proportion, and stirred evenly to obtain a mixture, finally, it was put in a crucible for later use.

Multi-function tube furnace with 99% corundum furnace chamber ($\phi$80 mm×950 mm) was mostly applied in this invention, opened the multifunctional tube furnace, raised the temperature according to the temperature control mode, controlled the temperature to the heat treatment temperature, and opened the furnace door; then, the crucible containing the mixture obtained in step (2) was pushed into a constant temperature zone in the furnace, and introduced air into the furnace, and the air flow rate was controlled to be 600 mL/min. After heat treatment for 2 h, closed the air valve and opened the furnace door, and took the crucible and placed it in a dryer for cooling to obtain residues.

The composition ratio of the mixtures of different embodiments and the temperature of heat treatment are shown in Table 1.

TABLE 1

The composition ratio of the mixtures of different embodiments and the temperature of heat treatment

| No | Composition/mass ratio | Heat treatment temperature |
| --- | --- | --- |
| Embodiment 1 | Leaching ash:municipal solid waste:CA auxiliaries = 1:30:0.05 | 950° C. |
| Embodiment 2 | Leaching ash:municipal solid waste:CA auxiliaries = 1:50:0.05 | 950° C. |
| Embodiment 3 | Leaching ash:municipal solid waste:CA auxiliaries = 1:30:0.05 | 850° C. |
| Embodiment 4 | Leaching ash:municipal solid waste:CA auxiliaries = 1:50:0.05 | 850° C. |
| Embodiment 5 | Leaching ash:municipal solid waste:CA auxiliaries = 1:30:0.05 | 1050° C. |
| Embodiment 6 | Leaching ash:municipal solid waste:CA auxiliaries = 1:50:0.05 | 1050° C. |

The membrane concentrate used in the above embodiments comes from a municipal solid waste landfill in Beijing, and the landfill leachate of this factory adopts the treatment process of "anaerobic+aerobic+MBR+NF+RO", and the liquid obtained after being intercepted by nanofiltration membrane; The incineration fly ash comes from a waste incineration plant in the Arctic; the garbage comes from a garbage sorting station in Chaoyang District, Beijing.

In the embodiment, the CA additive comprises the following components in parts by mass: 20 parts of $SiO_2$, 28 parts of $Al_2O_3$, 30 parts of $Na_2O$, 10 parts of $Fe_2O_3$ and 5 parts of MgO, and the added amount of the CA additive is 5 wt % of the leaching ash.

See Table 2 for chloride and heavy metal contents in specific membrane concentrated solution, Table 3 for heavy metal contents in incineration fly ash, and Table 4 for leaching toxicity of incineration fly ash. Referring to China's Ion Chromatography for Determination of Inorganic Anions in Water Quality ($F^-$, $Cl^-$, $NO_2^-$, $Br^-$, $NO_3^-$, $PO_4^{3-}$, $SO_3^{2-}$, $SO_4^{2-}$) (HJ 84-2016) and the heavy metal content and leaching toxicity of incineration fly ash were determined by the methods of "Determination of Metal Elements in Solid Waste" (HJ 766-2015) and "Leaching Toxicity of Solid Waste by Sulfuric Acid and Nitric Acid Method" (HJ/T299-2007).

TABLE 2

Contents of chloride and heavy metals in membrane concentrate

| Test items | Measured value |
|---|---|
| pH | 7.02~7.10 |
| Chloride (mg/L) | 3988.11 |
| Pb (mg/L) | 1.51 |
| Zn (mg/L) | 0.91 |
| Cu (mg/L) | 0.02 |
| Cd (mg/L) | ND |
| Cr (mg/L) | 0.58 |

TABLE 3

Heavy metal content in fly ash

| Items | Measured value | Standard limit value [a] | Standard limit value [b] |
|---|---|---|---|
| pH | 12.01~12.57 | — | — |
| Pb (mg/L) | 257.12 | 5 | 0.25 |
| Zn (mg/L) | 6.32 | 100 | 100 |
| Cu (mg/L) | 2.91 | 100 | 40 |
| Cd (mg/L) | 0.01 | 1 | 0.15 |
| Cr (mg/L) | 0.22 | 15 | 4.5 |

Remarks: a) The standard limit value is the limit value illustrated in Table 1 of Identification Standard of Hazardous Wastes-Identification of Leaching Toxicity (GB5085.3-2007); B) The standard limit value is the limit value illustrated in Table 1 of Pollution Control Standard of municipal solid waste Landfill Site (GB16889-2008).

Comparative Embodiment 1

Comparative embodiment 1, referring to embodiment 1, the only difference is the temperature of heat treatment. The heat treatment temperature of comparative embodiment 1 is 750° C.

Comparative Embodiment 2

Comparative Embodiment 2, referring to Embodiment 1, the only difference is that the temperature of heat treatment. The heat treatment temperature of Comparative embodiment 2 is 1150° C.

Embodiment 1

Under the condition of membrane concentrate and leaching of fly ash in the embodiment of the invention, the total elution efficiency of chloride in fly ash is 94.5%, and the total elution efficiency of corresponding Pb is 41.8% when the thickness of fly ash layer is 12 cm and the leaching speed is 40 mL/h; the leaching toxicity is reduced by 90.1%.

In order to compare the effects of different treatment conditions on the leaching concentration and leaching toxicity of heavy metals in the treated residues, the leaching toxicity of solid samples was analyzed by the method of "Leaching Toxicity of Solid Wastes-Sulfuric Acid Nitric Acid Method (HJ/T299-2007)" and the leaching toxicity of solid samples was analyzed by the method of "Identification Standard for Hazardous Wastes-Leaching Toxicity Identification (GB5085.3-2007)". The test results are shown in Table 5 and Table 5 respectively.

TABLE 5

Effects of different treatment conditions on leaching concentration of heavy metals in residue

| No | Cr (mg/L) | Cd (mg/L) | Pb (mg/L) | Zn (mg/L) | Cu (mg/L) |
|---|---|---|---|---|---|
| Embodiment 1 | $3.2 \times 10^{-1}$ | $6.4 \times 10^{-4}$ | $0.7 \times 10^{-3}$ | $4.4 \times 10^{-3}$ | $1.0 \times 10^{-3}$ |
| Embodiment 2 | $2.1 \times 10^{-1}$ | $6 \times 10^{-4}$ | $0.10 \times 10^{-3}$ | $0.7 \times 10^{-3}$ | $1.0 \times 10^{-3}$ |
| Embodiment 3 | $1.4 \times 10^{-1}$ | $4.1 \times 10^{-4}$ | $0.16 \times 10^{-3}$ | $8.5 \times 10^{-3}$ | $1.7 \times 10^{-3}$ |
| Embodiment 4 | $2.0 \times 10^{-1}$ | $6 \times 10^{-4}$ | $0.10 \times 10^{-3}$ | $1.8 \times 10^{-3}$ | $1.1 \times 10^{-3}$ |
| Embodiment 5 | $2.4 \times 10^{-1}$ | $0.7 \times 10^{-4}$ | $0.6 \times 10^{-3}$ | $0.4 \times 10^{-3}$ | $0.4 \times 10^{-3}$ |
| Embodiment 6 | $1.4 \times 10^{-1}$ | $0.5 \times 10^{-4}$ | $0.7 \times 10^{-3}$ | $0.3 \times 10^{-3}$ | $0.5 \times 10^{-3}$ |
| Standard limit value [a] | 15 | 1 | 5 | 100 | 100 |
| Standard limit value [b] | 4.5 | 0.15 | 0.25 | 100 | 40 |

Remarks: a) The standard limit value is the limit value in Table 1 of Identification Standard of Hazardous Wastes-Identification of Leaching Toxicity (GB5085.3-2007); B) The standard limit value is the limit value in Table 1 of Pollution Control Standard of municipal solid waste Landfill Site (GB 16889-2008)

TABLE 6

Effects of different treatment conditions on toxic substances in residue

| Toxic substance [c] | Highly toxic substance (%) | Toxic substance (%) | | | Carcinogenic substance (%) | | Mutagenic substance (%) | Reproductive toxic substance (%) | | Cumulative toxicity d) (%) |
|---|---|---|---|---|---|---|---|---|---|---|
| | CdSe | PbF$_2$ | ZnF$_2$ | PbO | chromate | CdO | CdF$_2$ | PbCrO$_4$ | Pb$_3$(PO$_4$)$_2$ | |
| Embodiment1 | 0.0015 | 0.013 | 0.063 | 0.013 | 0.0080 | 0.0015 | 0.0015 | 0.013 | 0.013 | 0.21 |
| Embodiment2 | 0.0007 | 0.012 | 0.041 | 0.012 | 0.0078 | 0.0007 | 0.0007 | 0.012 | 0.012 | 0.17 |
| Embodiment3 | 0.0012 | 0.021 | 0.065 | 0.021 | 0.0071 | 0.0012 | 0.0012 | 0.021 | 0.021 | 0.23 |
| Embodiment4 | 0.0015 | 0.016 | 0.041 | 0.016 | 0.0076 | 0.0015 | 0.0015 | 0.016 | 0.016 | 0.21 |
| Embodiment5 | 0.0064 | 0.0074 | 0.034 | 0.0074 | 0.0096 | 0.0064 | 0.0064 | 0.0074 | 0.0074 | 0.33 |
| Embodiment6 | 0.0022 | 0.0062 | 0.031 | 0.0062 | 0.0075 | 0.0022 | 0.0022 | 0.0062 | 0.0062 | 0.18 |

TABLE 6-continued

Effects of different treatment conditions on toxic substances in residue

| Toxic substance c) | Highly toxic substance (%) | | Toxic substance (%) | | Carcinogenic substance (%) | | Mutagenic substance (%) | Reproductive toxic substance (%) | | Cumulative toxicity d) (%) |
|---|---|---|---|---|---|---|---|---|---|---|
| | CdSe | PbF$_2$ | ZnF$_2$ | PbO | chromate | CdO | CdF$_2$ | PbCrO$_4$ | Pb$_3$(PO$_4$)$_2$ | |
| Standard limit value | 0.1 | | 3 | | 0.1 | | 0.1 | 0.5 | | 1 |

Remarks: c) Compounds are only selected when calculating toxic substances according to the most unfavorable assumptions, and do not represent the actual contents in the waste; D) Calculate and judge the cumulative toxicity according to the following formula: Identification Standard of Hazardous Wastes-Identification of Toxic Substances Content (GB 5085.6-2007).

$$\sum\left[\left(\frac{p_{T^+}}{L_{T^+}} + \frac{p_T}{L_T} + \frac{p_{Carc}}{L_{Carc}} + \frac{p_{Muta}}{L_{Muta}} + \frac{p_{Tera}}{L_{Tera}}\right)\right] \geq 1$$

Wherein: $P_T^+$ is the content of highly toxic substances in solid waste; $P_T$ is the content of toxic substances in solid waste; $P_{Care}$ is the content of carcinogens in solid waste; $P_{Muta}$ is the content of mutagenic substances in solid waste; $P_{Tera}$ is the content of reproductive toxic substances in solid waste; $L_T^+$, $L_T$, $L_{Care}$, $L_{Muta}$, $L_{Tera}$ is the standard values of various toxic substances, respectively.

According to the above analysis results, the invention solves the problems existed in the co-disposal treatment of membrane concentrate, incineration fly ash and municipal solid waste, and the leaching toxicity of the ash leached by the membrane concentrated solution is reduced, moreover, after the leached ash is heat-treated with municipal solid waste at medium and high temperature, the leaching concentration of heavy metals in the residue obtained meets the corresponding limit requirements of "Pollution Control Standard for municipal solid waste Landfill" (GB 16889-2008), and it should not be included in the management of hazardous wastes after being identified by "Identification Standard of Hazardous Wastes" (GB5085.3-2007), and the residue after heat treatment can be used as building materials.

Finally, it should be explained that the above embodiments are only used to illustrate the technical scheme of the present invention, but not to limit it; Although the invention has been described in detail with reference to the foregoing embodiments, it should be understood by those skilled in the art that it can still modify the technical solutions described in the foregoing embodiments, or equivalently replace some or all technical features thereof; these modifications or substitutions do not make the essence of the corresponding technical solutions depart from the scope of the technical solutions of various embodiments of the present invention.

What is claimed is:

1. A co-disposal pollution control method of municipal solid waste and fly ash leached by membrane concentrate, comprising the following steps: carrying out heat treatment of a mixture of leached ash and municipal solid waste at 850~1050° C. to obtain a residue; wherein the leached ash in the mixture is fly ash leached with membrane concentrate; wherein the mixture also comprises a CA auxiliaries, and an addition amount of the CA auxiliaries is 5 wt %~20 wt % by mass of the leached ash;
wherein a chemical composition of the CA auxiliaries is weighed in parts by mass as follows: 18~22 parts of SiO$_2$, 26~30 parts of Al$_2$O$_3$, 28~32 parts of Na$_2$O, 8~12 parts of Fe$_2$O$_3$ and 3~8 parts of MgO; and
wherein a mass ratio of the leached ash to the municipal solid waste is 1:(25~55).

2. The co-disposal pollution control method of municipal solid waste and fly ash leached by membrane concentrate as claimed in claim 1, wherein the temperature of the heat treatment is 900~1000° C.

3. The co-disposal pollution control method of municipal solid waste and fly ash leached by membrane concentrate as claimed in claim 1, wherein the heat treatment time is 1~5 h.

4. The co-disposal pollution control method of municipal solid waste and fly ash leached by membrane concentrate as claimed in claim 1, wherein the atmosphere of heat treatment is air.

5. The co-disposal pollution control method of municipal solid waste and fly ash leached by membrane concentrate as claimed in claim 1, wherein a mass ratio of the leached ash to the municipal solid waste is 1:(30~50).

6. The co-disposal pollution control method of municipal solid waste and fly ash leached by membrane concentrate as claimed in claim 1, wherein the chemical composition of the CA auxiliaries is weighed in parts by mass as follows: 20 parts of SiO$_2$, 28 parts of Al$_2$O$_3$, 30 parts of Na$_2$O, 10 parts of Fe$_2$O$_3$ and 5 parts of MgO.

7. The co-disposal pollution control method of municipal solid waste and fly ash leached by membrane concentrate as claimed in claim 1, wherein preparation of the leached ash, comprises: leaching the fly ash with membrane concentrate, collecting solids and drying the collected solids.

8. The co-disposal pollution control method of municipal solid waste and fly ash leached by membrane concentrate as claimed in claim 3, wherein the heat treatment time is 1.5~2.5 h.

9. The co-disposal pollution control method of municipal solid waste and fly ash leached by membrane concentrate as claimed in claim 1, wherein an addition amount of the CA auxiliaries is 5 wt % by mass of the leached ash.

10. The co-disposal pollution control method of municipal solid waste and fly ash leached by membrane concentrate as claimed in claim 7, wherein the leaching rate is 40~80 ml/h.

11. The residue obtained by the co-disposal pollution control method of municipal solid waste and fly ash leached by membrane concentrate according to claim 1.

12. The residue as claimed in claim 11, a leaching concentration of heavy metals in the residue; meeting conditions as follows: a leaching concentration of Cr≤0.35 mg/L, a leaching concentration of Cd≤0.07 mg/L, a leaching concentration of Pb≤0.02 mg/L, a leaching concentration of Zn≤0.4 mg/L and a leaching concentration of Cu≤0.05 mg/l; and/or, a content of toxic substances in the residue; meeting conditions as follows: cadmium selenide ≤0.007%, lead difluoride ≤0.025%, zinc fluoride ≤0.07%, lead oxide ≤0.025%, chromate ≤0.01%, cadmium oxide ≤0.007%, cadmium fluoride ≤0.007%, lead chromate ≤0.025%, lead phosphate ≤0.025%.

* * * * *